US005540875A

United States Patent [19]

Rubio

[11] Patent Number: 5,540,875
[45] Date of Patent: Jul. 30, 1996

[54] METHOD AND APPARATUS FOR MANUFACTURING PLASTIC STRUCTURES

[76] Inventor: Rafael R. Rubio, 5134 Pendleton St., San Diego, Calif. 92109

[21] Appl. No.: 390,111

[22] Filed: Feb. 16, 1995

[51] Int. Cl.⁶ .............................. B29C 35/10; B32B 5/00
[52] U.S. Cl. ...................... 264/463; 264/112; 264/113; 264/119; 425/130; 425/363
[58] Field of Search ..................... 264/112, 113, 264/22, 25, 119; 425/130, 363

[56] References Cited

U.S. PATENT DOCUMENTS

| | | | |
|---|---|---|---|
| 4,141,929 | 2/1979 | Stoops et al. | 264/112 |
| 4,292,271 | 9/1981 | Buob et al. | 264/113 |
| 4,295,907 | 10/1981 | Cordts et al. | 264/112 |
| 4,973,440 | 11/1990 | Tamura et al. | 264/114 |
| 5,145,626 | 9/1992 | Bastiolli et al. | 264/112 |

*Primary Examiner*—Mary Lynn Theisen
*Attorney, Agent, or Firm*—Nydegger & Associates

[57] ABSTRACT

A system and a method for manufacturing plastic structures using ultra-violet curable plastic materials is provided. Specifically, the present invention applies a resin layer to a conveyor belt. The resin layer is then warmed and various types of reinforcing elements are added. The conveyor belt with the resin layer is then passed through a forming apparatus where a predetermined shape is imparted to the layer. The predetermined shape become permanent as the resin layer is exposed to ultra-violet radiation which cures and hardens the resin layer. The completed structure is then extracted from the process.

13 Claims, 2 Drawing Sheets

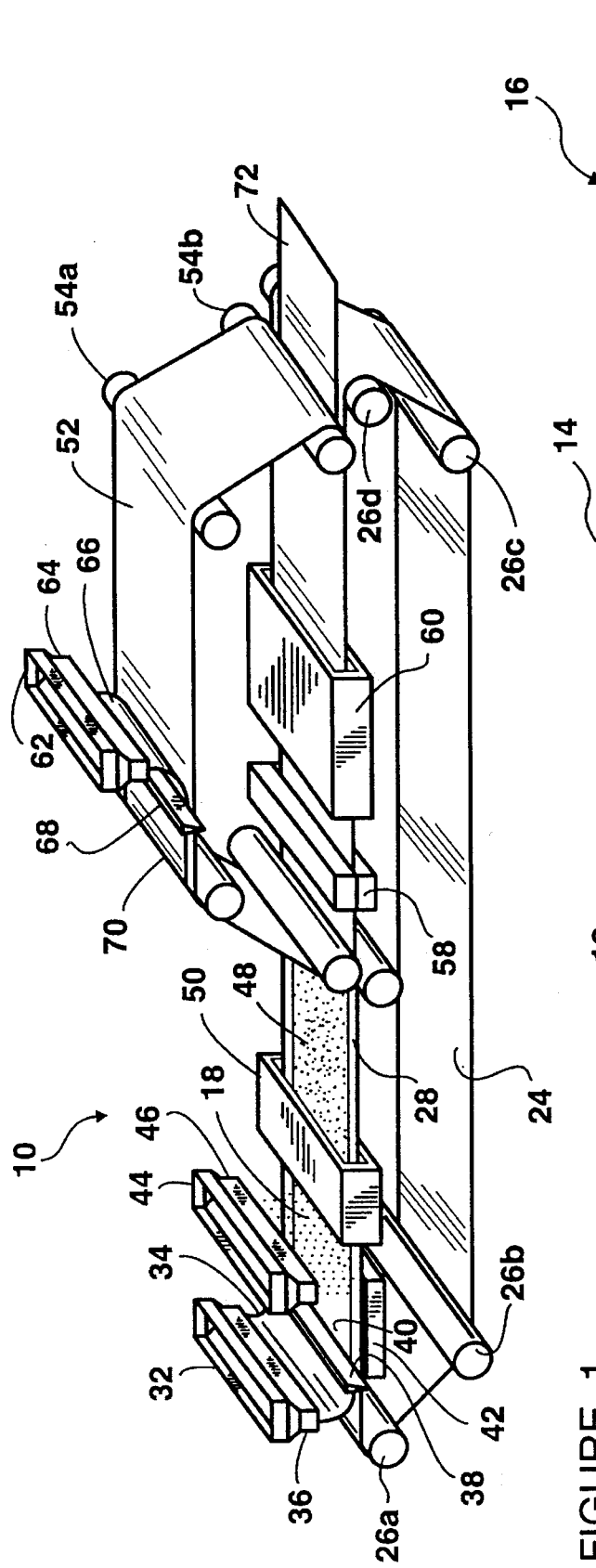
FIGURE 1
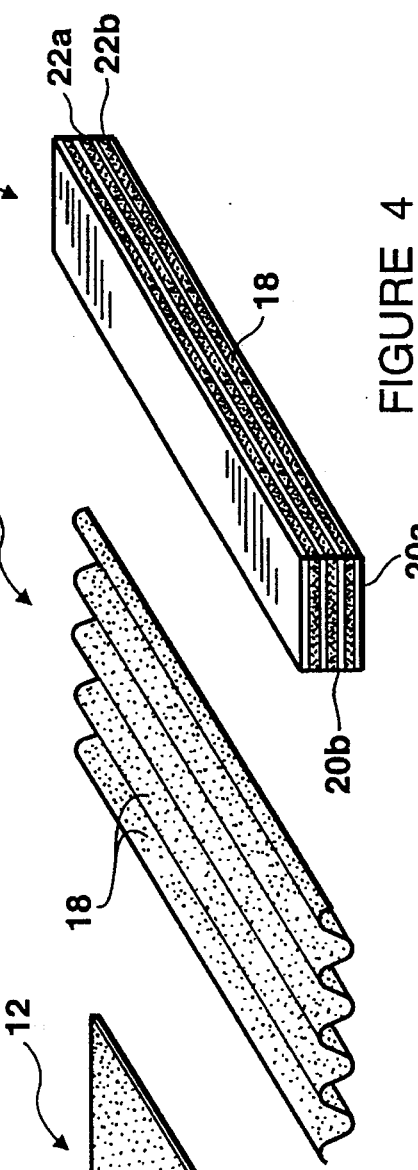
FIGURE 2
FIGURE 3
FIGURE 4

METHOD AND APPARATUS FOR MANUFACTURING PLASTIC STRUCTURES

FIELD OF THE INVENTION

The present invention relates generally to the fabrication of plastic structures. More specifically, the present invention relates to methods for forming curable plastic material into predetermined structures including boards and sheets. The present invention is particularly, but not exclusively, useful as an in-line, continuous, method for manufacturing ultra-violet cured plastic structures with reinforcing elements.

BACKGROUND

Historically, a large number of differing materials have been employed as building materials. For instance, the use of both wood and steel in the construction of commercial and residential buildings is well known. In general, selection between particular building materials, such as steel or wood, has been guided by a number of criteria. The criteria include cost and structural suitability and continuing efforts to balance these criteria have resulted in development of numerous alternative materials.

Recently, various types of plastic and composites have been developed as alternative building materials. These materials have been found to be both strong and durable. Additionally, many molding and forming techniques for plastics are well known. These molding and forming techniques allow plastic materials to be easily shaped into numerous structures including flat sheets and boards. Plastic materials may also be used in combination with numerous other materials to form composites, allowing the cost and other characteristics of the resulting products to be easily tailored to meet varying demands.

A prime consideration in the fabrication of plastic building materials is cost. In fact, market success of alternative building materials, such as plastics, is dependent on the cost effectiveness of these materials in relation to the more traditional materials that they are intended to replace. Cost effectiveness, is, in turn, dependent on the availability of low-cost fabrication methodologies and the use of low-cost raw materials.

In the past, fabrication of plastic structures, including those intended as building materials, has generally involved the use of a step-by-step process involving a number of distinct subsystems. In these processes, the output from each individual subsystem becomes the input for the next subsystem. As a result, each subsystem is repeatedly started and stopped and may experience idle periods as it waits for input from the preceding subsystem.

The non-continuous process typically employed to produce plastic structures includes a number of inherent disadvantages. One such disadvantage is high labor costs. Specifically, many of the individual subsystems may require supervision or operator intervention. Each subsystem that requires intervention or assistance generally increases the cost and unreliability of the fabrication process.

Another disadvantage associated with traditional methodologies is inefficiency caused by wasted material or energy. In greater detail, it may be appreciated that many of the subsystems employed in the production of plastic structures may have a start-up time during which the subsystem is brought up to its operating parameters. For example, a curing oven may have to reach a specific temperature before it can be effectively used. Subsystems of this type may waste energy or raw materials during the start-up period or have other undesirable side-effects such as increased air emissions. In general, inefficiencies of these types may result in higher operating costs and an associated increase in the cost of the final product.

Still another disadvantage typically associated with traditional manufacturing techniques for plastic structures is lack of output uniformity. Generally, it is highly advantageous if an industrial process may be conditioned to produce consistent results both within and between output batches. Consistency of this type allows the manufacturing process to be characterized and tuned to produce uniformly acceptable products. Unfortunately, manufacturing methodologies which operate in a step-by-step mode are often associated with inconsistent or varying output qualities. These inconsistencies are caused by the limited ability of the step-by-step process to continuously adapt to changing external conditions such as heat and humidity. Lack of consistency within batches and between batches may result in rejection of certain products and higher costs for the remaining products.

A second factor that contributes to the cost effectiveness of plastic structures used for building materials is the cost of input materials. It may be appreciated that in the case of plastic structures, the cost of the underlying plastic material may be quite high, especially for large structures that require high volumes of plastic. Cost of input materials has been especially important where traditional manufacturing techniques have been employed and the entire output product is fabricated from solid plastic.

One approach that has been successfully employed in an attempt to reduce the amount of raw input material used in the fabrication of plastic structures is the use of honeycomb or other hollow internal structure. This approach has yielded structures that are both strong and conserving of input materials. In practice, however, these structures are both complex and expensive to produce and require expensive adaptation and retooling for each different structure produced.

In light of the above, it is an object of the present invention to provide a system and a method for manufacturing plastic structures which operates as a continuous and on-going process. It is another object of the present invention to provide a system and a method for manufacturing plastic structures which features high operating efficiency both in terms of energy and materials consumed. Yet another object of the present invention is to provide a system and a method for manufacturing plastic structures which is adaptable to the production of numerous input material types and output shapes. Another object of the present invention is to provide a system and a method for manufacturing plastic structures which provides a high degree of output uniformity. Still another object of the present invention is to provide a system and a method for producing plastic structures that is not labor intensive. Still another object of the present invention is to provide a system and a method for manufacturing plastic structures which is relatively simple to use, is relatively easy to implement and is comparatively cost effective.

SUMMARY OF THE PREFERRED EMBODIMENT

The present invention provides a system and a method for manufacturing plastic structures. Specifically, the present invention starts with a liquid plastic such as an acrylic resin.

Numerous types of reinforcing elements may be added to the resin and the resulting material may then be formed into various shaped structures including flat and corrugated sheets. Once formed, the resin material is cured by exposure to ultra-violet radiation and the completed structure is removed from the process. Alternatively, different resin types may be used and differing curing methodologies may be employed.

The apparatus for manufacturing plastic structures in accordance with the present invention includes a first conveyor belt which is preferably manufactured from a Teflon coated nylon fabric. The first conveyor belt is mounted on rollers to establish a substantially flat, continually moving, working surface upon which the plastic material may be manipulated. For purposes of description, it may be assumed that the first conveyor belt has an upstream, input end, and a downstream, output end. Additionally, it may be assumed that the motion of the belt is such that objects placed at the input end are transported in a downstream direction over the length of the working surface to the output end.

In a more descriptive statement of the present invention, it may be noted that a resin dispenser is located over the input end of the first conveyor belt. The resin dispenser allows a continuous supply of the ultra-violet curable resin to be applied to the first conveyor belt. A doctor blade is also mounted over the first conveyor belt and positioned slightly downstream from the resin supply. The doctor blade spreads the resin applied by the dispenser into a film or layer on the working surface of the first conveyor belt.

The combination of the resin supply and doctor blade form a resin application subsystem and may be replaced with a sprayer or other applicator which spreads a uniform film of resin on the working surface. Regardless of the particular application technology employed, a partial curing oven is positioned immediately downstream from the resin application subsystem and used to partially cure the newly applied resin.

Immediately downstream from the partial curing oven, the working surface passes over a heating table which allows the working surface, and the resin on the working surface, to be heated for greater ease in manipulation. Next in line, a dispensing system for the reinforcing elements is located over the heating table and adds a continuous supply of reinforcing elements to the resin on the working surface. In general, the type and quantity of reinforcing elements may be varied widely to suit the desired qualities of the structures to be produced.

The combination of the dispensing system for the reinforcing elements and the heating table forms a reinforcing subsystem and it may be appreciated that the combination of the resin application subsystem and the reinforcing subsystem produces a two layer resin film on the working surface. In detail, it may be appreciated that downstream from the reinforcing subsystem, the working surface carries a layer of resin and a layer of reinforcing elements positioned over and partially mixed into the resin layer. For the purposes of the present invention, additional resin application subsystems and reinforcing subsystems may be added to produce final products with additional layers of resin or reinforcing elements. The ability to add additional layers by adding additional subsystems allows the present invention to be easily tailored to produce varying products.

A second conveyor belt, preferably fabricated from the same Teflon coated nylon material used in the first conveyor belt, is positioned over the working surface downstream from the reinforcing subsystem. The working surface and the second conveyor belts are positioned and oriented to establish a moving zone where the working surface and the second conveyor belt surround and sandwich the resin layer and reinforcing elements. It may be appreciated that the two outer surfaces provided by the working surface and the second conveyor belt allow the resin and reinforcing elements to be easily manipulated and shaped.

Once the working surface and the second conveyor belt have been joined, the working surface is passed through a forming apparatus which manipulates the working surface and the second conveyor belt to impart a predetermined shape to the resin layer which is sandwiched therebetween. The actual shape imparted may be varied by employing alternate forming apparatuses but generally includes shapes such as corrugation. The predetermined shape created by the forming apparatus is made permanent by passing the working surface and resin layer through an ultra-violet curing oven. The curing oven includes an ultra-violet radiation source which works in conjunction with the ultra-violet sensitizer in the resin layer to permanently harden the resin layer into the predetermined shape. Once curing is complete, the now-finished plastic structure is extracted as the second conveyor belt separates from the working surface at the output end of the working surface.

In certain cases, it may be desirable to form a second resin layer on the second conveyor belt before the second conveyor belt joins with the working surface. Application of the second resin layer allows the second conveyor belt to add an additional resin layer to the final product and can easily be accomplished by positioning a resin application subsystem over the second conveyor belt to apply the second resin layer.

The process of the present invention is initiated as a layer of plastic material is applied to the working surface by the resin application subsystem. Although many differing types of plastic may be used, it has been found that a mixture of acrylic resin and an ultra-violet sensitizer is particularly practical. A layer of reinforcing elements are then added by the reinforcing subsystem and partially mixed with the resin layer. Additional resin application subsystems and reinforcing subsystems may be added to create additional layers of resin and reinforcing elements. Next, the resin layer and reinforcing elements are covered by the second conveyor belt and passed through the forming apparatus where shaping such as corrugation may be added. After shaping, the curing oven exposes the layer to ultra-violet radiation which hardens the layer into a completed structure which may be extracted as the second conveyor belt separates from the working surface downstream from the curing oven.

BRIEF DESCRIPTION OF THE DRAWINGS

The novel features of this invention, as well as the invention itself, both as to its structure and its operation will be best understood from the accompanying drawings, taken in conjunction with the accompanying description, in which similar reference characters refer to similar parts, and in which:

FIG. 1 is an isometric view of the manufacturing apparatus of the present invention;

FIG. 2 is a isometric representation of a plastic structure as produced by the present invention;

FIG. 3 is an isometric representation of an alternate embodiment of a plastic structure as produced by the present invention;

FIG. 4 is an isometric representation of another alternate embodiment of a plastic structure as produced by the present invention;

DESCRIPTION OF THE PREFERRED EMBODIMENT

Figure 5:
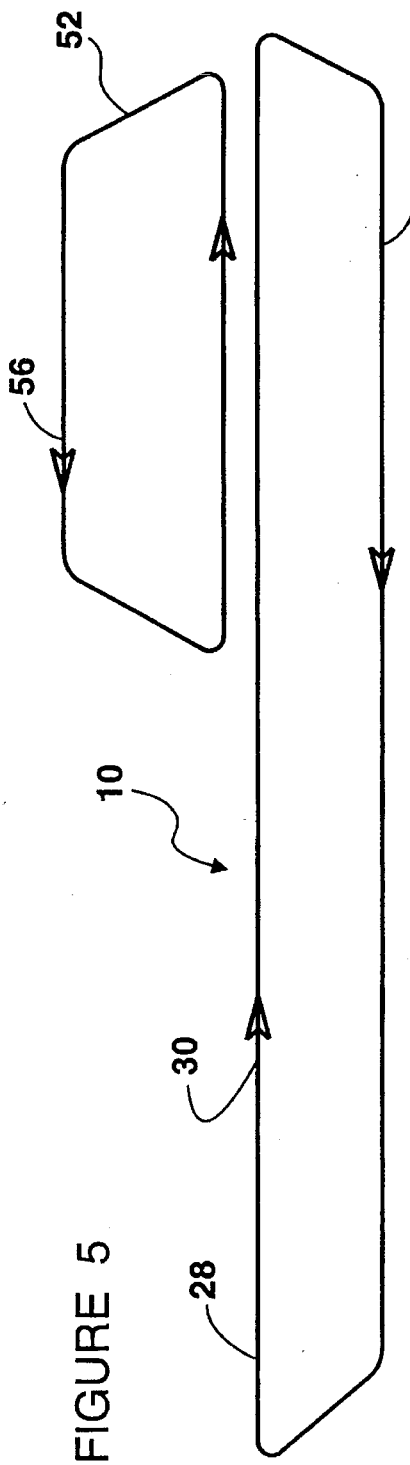
FIG. 5 is an schematic diagram of the conveyor belts used in the manufacturing apparatus of the present invention.

The present invention provides an in-line system and method for manufacturing plastic structures. The apparatus used to implement the present invention is shown in FIG. 1 and designated 10. In general, the apparatus 10 may be used to produce a wide variety of plastic structures such as the sheet shown in FIG. 2 and designated 12. Alternatively, the corrugated panel 14 shown in FIG. 3 may be produced as well as the laminated board 16 shown in FIG. 4. Importantly, and as shown in FIGS. 2, 3, and 4, the sheet 12, corrugated panel 14 and board 16 are all formed to include reinforcing elements 18 as part of their basic structures. Additionally, as shown in FIG. 4, the apparatus 10 may be used to form laminated structures which include layers of resin 20a, 20b and alternating layers 22a, 22b which include reinforcing elements 18.

The details of the manufacturing apparatus 10 may be, perhaps, best appreciated by reference to FIG. 1 where the manufacturing apparatus 10 is shown to include a first conveyor 24 mounted on a series of rollers 26a, 26b, 26c, 26d. Preferably, the first conveyor 24 is fabricated from a flexible belt of Teflon coated nylon cloth. Functionally, the first conveyor 24 provides a flat, continuously moving working surface 28 between the rollers 26a and 26d. The movement of the first conveyor is shown diagrammatically in FIG. 5 where the working surface 28 may be seen to travel in the direction indicated by the downstream arrow 30. For the purposes of illustration, the direction of travel indicated by the downstream arrow 30 will be referred to as the downstream direction.

Returning to FIG. 1, it may be seen that a resin dispenser 32 is located over the working surface 28 to apply a continuous supply of resin 34 to the working surface 28 just downstream from roller 26a. The rate at which the supply of resin 34 is added to the working surface 28 is controlled by a metering means 36 included in the resin dispenser 32. A doctor blade 38 positioned downstream from the resin dispenser 32 spreads the supply of resin 34 into a resin layer 40 on the working surface 28. Together, the resin dispenser 32, metering means 36 and doctor blade 38 comprise the resin application subsystem which functions to create the resin layer 40.

To achieve the goals of the present invention, any number of differing resin types may be applied by the resin application subsystem to form the resin layer 40. For example, the use of a mixture of an acrylic or polyester or combination acrylic/polyester based resin of a type similar or the same as manufactured by Alpha or BASF, and an ultra-violet sensitizer of a type similar or the same as manufactured by Ciba-Geigy has been found to be highly beneficial. It should be appreciated, however, that these materials are intended to be exemplary and other materials types are equally practical.

Downstream from the resin application subsystem, the working surface 28 and the resin layer 40 pass over a heating table 42 where the resin layer 40 is warmed and increased in pliability. As shown in FIG. 1, a dispenser 44 for dispensing reinforcing elements 18 is located over the working surface 28 and positioned slightly downstream from the heating table 42. Like the resin dispenser 32, the dispenser 44 for reinforcing elements includes a metering means 46 allowing the dispenser 44 to apply a continuous layer of reinforcing elements 18 to the working surface 28, over the resin layer 40. Together, the heating table 42, dispenser 44, and metering means 46 form a reinforcing subsystem which functions to create the layer 48 of reinforcing elements 18.

To achieve the goals of the present invention any number of differing types of reinforcing elements may be used to form the layer of reinforcing elements 48. For example, in cases where a high-strength structure is being produced, the layer of reinforcing elements 48 may include glass, Kevlar or other fibers. Alternatively, in cases where a low cost structure is required and strength is not of paramount importance, wood chips or even processed refuse products maybe used to form the layer of reinforcing elements 48.

Downstream from the reinforcing subsystem, the working surface 28, carrying the resin layer 40 and the layer 48 of reinforcing elements 18, passes through a partial curing oven 50 where the resin layer 40 is partially hardened by exposure to ultraviolet radiation. Preferably, the partial curing oven 50 hardens the resin layer 40 to a point where it may be formed and shaped without causing the resin layer 40 to flow.

As the working surface 28 leaves the partial curing oven 50, it is covered by a second conveyor 52. Like the first conveyor 24, the second conveyor 52 is mounted on a series of rollers 54a, 54b, 54c. Preferably, the second conveyor 52 is fabricated from the same Teflon coated nylon material used to form the first conveyor 24.

Functionally, the second conveyor 52 is intended to provide a cover for the working surface 28 and to effectively sandwich the resin layer 40 and the layer of reinforcing elements 48 between the working surface 28 and the second conveyor 52. Therefore, and as shown in FIG. 1 and FIG. 5, the second conveyor 52 is positioned and oriented to face the working surface 28. In fact, the second conveyor 52 is positioned to contact and ride on top of the working surface 28 so that movement of the working surface 28 causes an equivalent movement of the second conveyor 52. For clarity, the direction of movement for the second conveyor 52 is in FIG. 5 shown by the arrow designated 56.

After the working surface 28 is covered by the second conveyor 52, the working surface 28, resin layer 40 and layer of reinforcing elements 48 are passed through a forming apparatus 58. The forming apparatus 58 may be used to apply any number of predetermined textures or shapes to the resin layer 40 to produce varying embodiments such as the corrugated panel 14 shown in FIG. 3. To impart shapes and textures to the resin layer 40 and layer of reinforcing elements 48, the forming apparatus 58 applies pressure to the outer surfaces of the working surface 28 and the second conveyor 52 thereby manipulating the resin layer 40 and layer of reinforcing elements 48 sandwiched therebetween.

Downstream from the forming apparatus 58, the working surface passes through a curing oven 60 where the resin layer 40 and layer of reinforcing elements 48 are exposed to ultraviolet radiation. The ultraviolet radiation interacts with the ultraviolet sensitizer in the resin layer 40 causing the resin layer 40 to harden into the predetermined shape imparted by the forming apparatus 58. For the purposes of the present invention, the intensity of ultraviolet radiation used in the curing oven 60 is adjustable to account for varying input materials, structure shapes and environmental factors such as temperature and humidity.

In addition to providing a means by which the resin layer 40 and layer of reinforcing elements 48 may be covered for the processing by the forming apparatus 58, the second conveyor 52 may itself be used to apply additional layers of resin or reinforcing elements to the working surface 28. Application of an additional resin layer of this type is shown in FIG. 1 where an additional resin dispenser 62 is shown located over the second conveyor 52. Like the resin application subsystem used to apply the resin layer 40 to the working surface 28, the additional resin dispenser 62 uses a metering means 64 to accurately deliver an additional resin supply 66 to the second conveyor 52. An additional doctor blade 68 spreads the additional resin supply 66 over the second conveyor 52 to form an additional resin layer 70. It may be appreciated that the additional resin layer 70 will form a covering layer for the layer of reinforcing elements 48 as the second conveyor 52 covers the working surface 28.

As the working surface 28 leaves the curing oven 60, the second conveyor 52 separates from the working surface 28 exposing the resin layer 40 and allowing the resin layer 40 and layer of reinforcing elements 48, which have become the output structure 72, to be extracted from the manufacturing apparatus 10.

It may be appreciated that the apparatus 10 is intended to be a modular system which allows the various subsystems to be combined in varying embodiments to produce varying output structures. For example, an alternative embodiment of the apparatus 10, shown in FIG. 6, includes the same resin dispenser 32, metering means 36 and doctor blade 38 shown in FIG. 1. As previously discussed, these elements form a resin application subsystem and function together to apply a resin layer 40 to the working surface 28.

Figure 6:
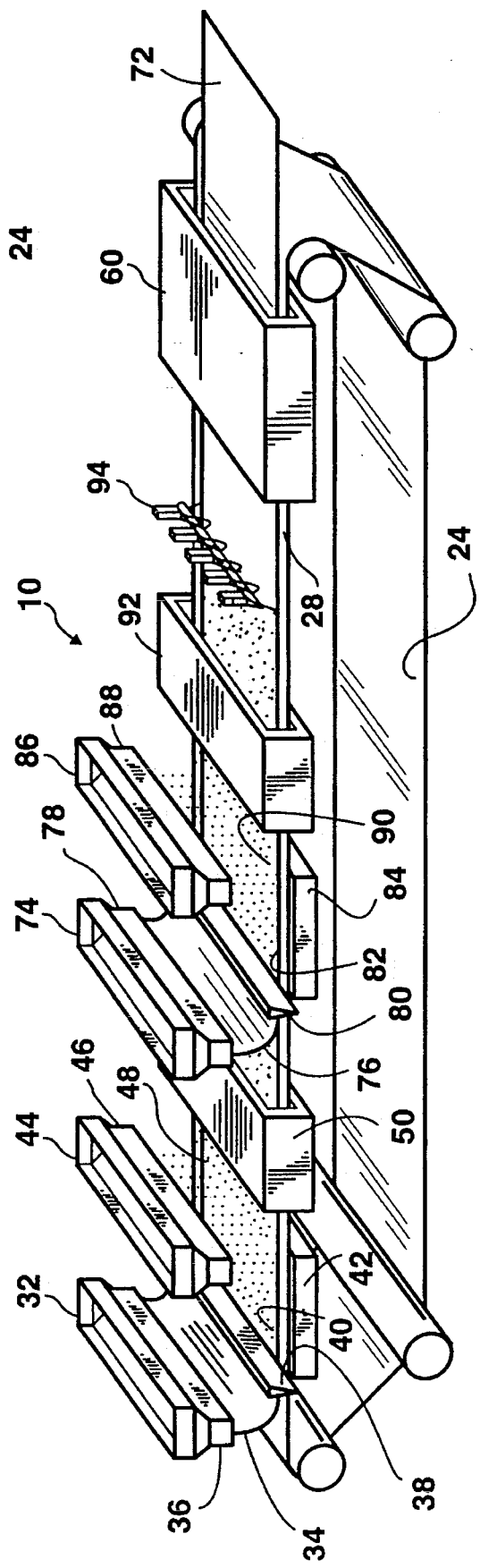
FIG. 6 is an isometric view of an alternate embodiment of the manufacturing apparatus of the present invention.

The apparatus 10 shown in FIG. 6 also includes the heating table 42, dispenser for reinforcing elements 44, and metering means 46 which form the reinforcing subsystem used in the apparatus 10 shown in FIG. 1. As a result, the resin layer 40 applied on the working surface 28 of the apparatus 10 shown in FIG. 6, is covered by a layer of reinforcing elements 48.

Unlike the apparatus 10 of FIG. 1, however, the apparatus 10 of FIG. 6 includes a second resin dispenser 74 positioned downstream from the partial curing oven 50 to apply a second resin supply 76 to the working surface 28. The second resin dispenser 74 is equipped with a metering means 78 to control the rate at which the second resin supply 76 is applied to the working surface 28. Once applied, the second resin supply 76 is spread over the working surface 28 by a second doctor blade 80. Together, the second resin dispenser 74, metering means 78 and second doctor blade 80 form a second resin application subsystem which functions to apply a second resin layer 82 over the layer of reinforcing elements 48. It may be appreciated, then, that the second resin application subsystem is, in effect, a replication of the first resin application.

As shown in FIG. 6, the second resin application subsystem is followed by a second reinforcing subsystem which includes a second heating table 84, second dispenser for reinforcing elements 86 and a metering means 88. Functionally, the elements of the second reinforcing subsystem cooperate to apply a second layer of reinforcing elements 90 to the working surface 28. Downstream from the second reinforcing subsystem, a second partial curing oven 92 partially cures the newly applied second resin layer 82 and second layer of reinforcing elements 90.

It may be appreciated that the addition of the second resin application subsystem and second reinforcing subsystem to the apparatus 10 shown in FIG. 6 results in the application of additional layers of resin and reinforcing elements to produce a laminated structure such as the board 16 shown in FIG. 4. For the purposes of the present invention, the number of additional resin application subsystems and reinforcing subsystems may be varied to suit the requirements of the intended output structure. Specifically, as many as eight to ten resin application subsystems and eight to ten reinforcing subsystems have been found to be practical.

It should also be appreciated that the elements that comprise the resin application subsystems and reinforcing subsystems may be varied to suit the requirements of differing types of resin and differing types of reinforcing elements. For example, in FIG. 6 an alternative embodiment for the resin application subsystem consisting of a resin sprayer 94 is shown positioned downstream from the second partial curing oven 92. Functionally, the resin sprayer 94 performs the same basic task as the combination of resin dispenser 32 and doctor blade 38 previously discussed. The resin sprayer, however, is generally more suitable for certain resin types.

OPERATION

The manufacturing apparatus 10 of the present invention is intended to be used as part of a continuous, in-line, production process. The process starts as shown in FIG. 1, as the resin application subsystem applies a resin layer 40 to the working surface 28. After the resin layer 40 is applied to the working surface 28, a layer of reinforcing elements 22 is applied over the resin layer 40 by the reinforcing subsystem. The newly applied resin layer 40 and layer of reinforcing elements 48 are then partially cured by exposure to ultraviolet radiation.

For the purposes of the present invention, the application of resin layer 40 and layer of reinforcing elements 48 is intended to be a modular process and additional layers of resin or reinforcing elements may be added by providing additional resin application subsystems or reinforcing subsystems. In this manner, multi-layer laminated structures of varying complexity may be produced.

In cases where shaping or texturing is required, the resin layer 40 and the layer of reinforcing elements 48 are covered by the second conveyor 52. The resin layer 40 and the layer of reinforcing elements 48 are then passed through the forming apparatus 58 where a predetermined shaping may be applied to produce a predetermined shape, such as the corrugated panel 14 shown in FIG. 3. Generally, the type of predetermined shape added to the resin layer 40 and the layer of reinforcing elements 48 by the forming apparatus 58 is widely variable and entirely dependent on the intended use of the output structure 72.

The resin layer 40 and the layer of reinforcing elements 48 are then hardened by exposure to ultraviolet radiation in the curing oven 60 which completes the output structure 72. The process of the present invention is completed as the output structure 72 is removed from the manufacturing apparatus 10.

While the particular system and method for manufacturing plastic structures as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

I claim:

1. A continuous, in-line system for manufacturing a plastic structure into a predetermined shape which comprises:

a conveyor;

means for dispensing a layer of plastic resin onto said conveyor;

a plurality of means for dispensing a layer of reinforcing elements onto said layer of plastic resin to establish a series of layers of reinforcing elements on said conveyor; and means for curing said resin in said predetermined shape to create said plastic structure.

2. A system as recited in claim 1 further comprising a plurality of said means for dispensing a layer of plastic resin to establish a series of resin layers on said conveyor.

3. A system as recited in claim 1 wherein said means for dispensing a resin layer on said conveyor is a resin sprayer.

4. A system as recited in claim 1 wherein said means for dispensing a layer of plastic resin onto said conveyor further comprises a resin hopper for applying a supply of resin to said conveyor and a doctor blade for spreading said resin into a layer.

5. A system as recited in claim 1 wherein said curing means is an ultra-violet lamp.

6. A system as recited in claim 1 further comprising means coupled with said conveyor for forming said resin layer and said layer of reinforcing elements into a predetermined shape.

7. A system as recited in claim 6 wherein said forming means further comprises means for covering said resin and said reinforcing elements on said conveyor and wherein said forming means forms said resin into said predetermined shape between said covering means and said conveyor.

8. A system as recited in claim 7 wherein said covering means is a conveyor belt.

9. A system as recited in claim 8 further comprising means for heating said resin on said conveyor to soften said resin layer to facilitate said application of said layer of reinforcing elements.

10. A method for manufacturing a plastic structure which comprises:

dispensing a plastic resin onto a conveyor;

heating said resin on said conveyor belt;

applying a plurality of reinforcing elements onto said resin on said conveyor;

partially curing said resin and said reinforcing elements on said conveyor;

forming said resin and said reinforcing elements into a predetermined shape on said conveyor; and curing said resin in said predetermined shape on said conveyor to create said plastic structure.

11. A method as recited in claim 10 wherein said steps of dispensing a plastic resin onto a conveyor, heating said resin, applying a plurality of reinforcing elements and partially curing said resin and said reinforcing elements on said conveyor comprise a preparation subsystem.

12. A method as recited in claim 11 wherein said steps of forming said resin and said reinforcing elements into a predetermined shape on said conveyor and curing said resin in said predetermined shape on said conveyor comprises a processing subsystem.

13. A method as reacted in claim 12 further comprising a plurality of said preparation subsystems to form a lamination of resin and reinforcing elements on said conveyor.

* * * * *